United States Patent [19]

Geller et al.

[11] 4,338,506
[45] Jul. 6, 1982

[54] METHOD OF TRIMMING THICK FILM CAPACITOR

[75] Inventors: Gary R. Geller, Plantation; Anthony B. Suppelsa, Coral Springs; William J. Martin, Ft. Lauderdale, all of Fla.

[73] Assignee: Motorola, Inc., Schaumburg, Ill.

[21] Appl. No.: 73,404

[22] Filed: Sep. 7, 1979

[51] Int. Cl.³ .............................................. H01G 7/00
[52] U.S. Cl. ........................... 219/121 LJ; 29/25.42; 361/271
[58] Field of Search ............... 361/321, 304, 271, 313, 361/305; 29/25.42; 219/121 LH, 121 LJ

[56] References Cited

U.S. PATENT DOCUMENTS

| | | | |
|---|---|---|---|
| 2,235,489 | 3/1941 | Rath | 361/321 X |
| 2,335,714 | 11/1943 | Voigtmann | 361/313 |
| 2,919,483 | 1/1960 | Gravley | 361/321 X |
| 3,379,942 | 4/1968 | Davis | 361/321 |
| 3,600,652 | 8/1971 | Riley | 361/321 |
| 3,683,245 | 8/1972 | Bacher | 361/304 |
| 3,872,360 | 3/1975 | Sheard | 361/305 |
| 3,947,934 | 4/1976 | Olson | 361/271 |
| 3,988,651 | 10/1976 | Hertz | 361/305 |
| 4,081,653 | 3/1978 | Koo . | |

FOREIGN PATENT DOCUMENTS

| | | | |
|---|---|---|---|
| 262272 | 12/1926 | United Kingdom | 361/271 |
| 475654 | 11/1937 | United Kingdom | 361/304 |

*Primary Examiner*—Elliot A. Goldberg
*Attorney, Agent, or Firm*—Donald B. Southard; Edward M. Roney; James W. Gillman

[57] ABSTRACT

An adjustable thick film capacitor includes a conductive paste layer which is fired to form a first electrode on a substrate, at least one dielectric paste layer over the conductive electrode which is also fired, and an organo-metallic paste layer over the dielectric layer, which is fired at high temperature to form a very thin sintered metallic conductive layer for the second electrode. The organo-metallic paste includes molecules having conducting particles, such as gold atoms, which after firing form a residue layer having a thickness of the order of 1 micron. This thin electrode can be trimmed by an accurately controlled low energy laser beam to adjust the capacitor value.

5 Claims, 12 Drawing Figures

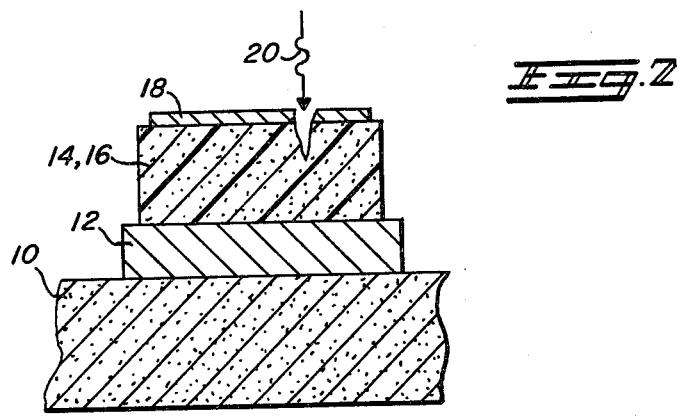
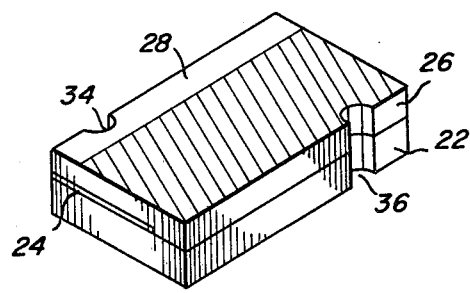
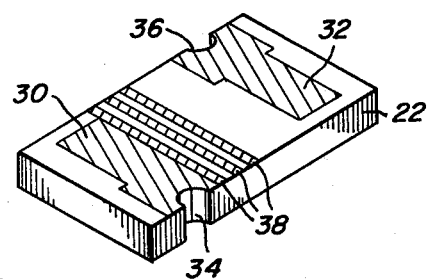

METHOD OF TRIMMING THICK FILM CAPACITOR

BACKGROUND OF THE INVENTION

In order to provide capacitors which can be mass produced at low cost, and which have accurately controlled values, it is desirable to be able to adjust the value at the end of the manufacturing operation. Capacitors have been manufactured using thin fllm technology wherein one or more electrodes are trimmed, as by use of a laser, to adjust the capacitance value. However, this thin film technology requires the formation of metal and dielectric layers by deposition in a vacuum chamber. As masks must be used in the vacuum chamber to determine the patterns of the layers, the process requires the use of sophisticated and complicated equipment, and is slow and expensive.

Capacitors have also been made by using thick film layers which can be screened so that the process is relatively simple and inexpensive. Such layers are much thicker, such as from 12 to 30 microns thick, as compared to one-third of a micron for thin film layers. Because of the thickness of the electrodes and the properties of the electrodes and dielectric materials, it has not been possible to remove a portion thereof to adjust the capacitor value, without causing damage to the capacitor. Also techniques used with thin film capacitors, such as applying a voltage across the electrodes during laser trimming to prevent shorts, does not work with thick film capacitors as the large voltage required due to the dielectric thickness may exceed the dielectric strength of the dielectric material.

SUMMARY OF THE INVENTION

It is an object of this invention to provide a method of manufacture of adjustable film capacitors which is simple and inexpensive.

Another object is to provide a process for making thick film capacitors wherein the value of the capacitor can be adjusted by laser trimming without damaging the capacitor.

A further object of the invention is to provide a thick film process for making capacitors wherein one electrode is very thin and is subject to trimming by use of low energy which does not penetrate the dielectric to short the electrodes.

A still further object is to provide a process for making an inexpensive thick film chip capacitor which includes laser trimming to provide the precise value desired.

In practicing the invention, a thick film capacitor which may be used on a hybrid microelectric circuit, or as a chip capacitor, is formed by screening a conductive paste layer on a substrate. The paste layer is then dried and fired to form a first electrode. One or more dielectric layers (generally two) are then applied by screening dielectric paste layers on the electrode, and these layers are dried and fired. This is followed by screening an organo-metallic paste layer over the dielectric layer, which can be a thick, semi-gelled liquid including molecules having gold atoms or particles therein. This layer is dried and fired and the molecules are reduced by high temperature to form a very thin layer of sintered gold balls or particles which engage each other to form a continuous conducting electrode. A laser beam may be directed on this thin electrode to vaporize the desired parts of the top electrode only to provide the required capacitor value. As this electrode is very thin, such as 1 micron, it can be removed by a low energy beam which does not penetrate the dielectric to short the capacitor, or otherwise damage the same. The pattern of the laser beam trimming can be computer controlled as the capacitor is monitored for precise control of the capacitor value.

A chip capacitor constructed as described can have plated conductors extending from the electrodes through recesses on holes in the chip carrier to terminal pads on the chip carrier for making connections to a circuit.

BRIEF DESCRIPTION OF THE DRAWINGS

FIG. 2 is an enlarged cross-sectional view of a capacitor constructed in accordance with the invention;

FIG. 3 is a perspective view of a chip capacitor constructed by the process of the invention; and FIG. 4 is a bottom view of the carrier of FIG. 3.

DETAILED DESCRIPTION OF THE INVENTION

FIG. 1 illustrates the steps of the process for making a capacitor in accordance with the invention, with drawings A through J showing the capacitor in the various stages of construction. FIG. 1A shows the substrate 10 which can be a part of a microelectric circuit, or the carrier of a chip capacitor. The substrate 10 can be made of alumina, or any other suitable material, and can have a thickness typically of the order of 10 to 25 mils. The layer 12 on the substrate 10 can be any known conductive paste, such as gold, platinum silver, platinum gold or palladium silver. This paste can be screened on the substrate 10 in the desired shape and can have a thickness of the order of 30 microns.

Figure 1A:
FIG. 1 illustrates the steps of the process of the invention.
Figure 1B:

The paste 12 is allowed to dry so that the volatile portions of the screening vehicle evaporate and the tackiness is removed. Then it is fired at a temperature of the order of 850° C. to 1000° C. for a period of 5 to 10 minutes. The layer is reduced to the order of 26 microns by the drying operation, and is further reduced in thickness by the firing which sinters the dry paste into a dense metal layer which has a final thickness of the order of 12 to 15 microns. FIG. 1B shows the substrate 10 with the fired conductive layer 12 thereon.

Figure 1C:
Figure 1D:

After the conductive layer 12 is fired, a layer 14 of dielectric paste is screened therein, as shown by FIG. 1C. This should be a low-K glass dielectric composition, such as No. 9950 manufactured by E. I. DuPont DeNemours & Co., Wilmington, Del., or No. A-2835 manufactured by Engelhard Minerals and Chemicals Corp., East Newark, N.J. The dielectric layer 14 can have a thickness of the order of 30 to 40 microns when applied. This layer is allowed to dry, first at room temperature for 5 to 10 minutes, and then at 100° C. to 125° C. for 10 to 15 minutes. After drying, the dielectric layer is fired at a temperature of the order of 850° C. to 950° C. for 7 to 10 minutes. The layer 14 is reduced to a thickness of the order of 15 to 20 microns by the drying and firing operations, as shown by FIG. 1D.

Figure 1E:
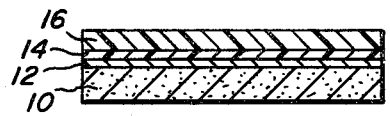
Figure 1F:

It has been found that for best surface smoothness and minimum pinholes, a second layer 16 of dielectric paste should be applied, and this is shown by FIG. 1E. This layer can be of the same material and have the same thickness as the layer 14 when applied. This layer is also dried and fired and reduced in thickness. The total thickness of the two layers can be of the order of 30 to 45 microns, as shown by FIG. 1F. In the subsequent illustrations, the two layers 14 and 16 will be shown as a single layer.

Figure 1G:
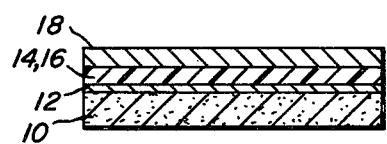
Figure 1H:
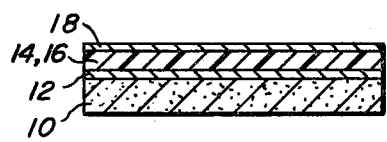

After the dielectric layers 14 and 16 are fired, a second conductive paste layer is applied, as shown at 18 in FIG. 1G. This conductive layer is the top electrode of the capacitor device, and is not connected to the conductive layer 12. This is an organo-metallic paste which includes molecules having atoms of conductive metal, such as gold, platinum or palladium. Suitable materials for this use are Bright Gold No. A3725 and No. 6340 available from Engelhard Minerals and Chemical Corp. These are thick semi-gelled solutions which contain of the order of 15% to 18% gold. The layer 18 is screened on the dielectric in the desired pattern in a thickness of about 25 microns. After drying, the organo-metallic paste is fired at a temperature of about 850° C. This acts to sinter the paste so that very small gold balls, plates or particles are formed which contact each other forming a continuous conducting electrode. The firing reduces the layer to a thickness of no more than 2 microns, and preferably about 1 micron. This is illustrated in FIG. 1H, with the layer 18 being shown many times thicker than it is for better illustration.

Figure 1J:
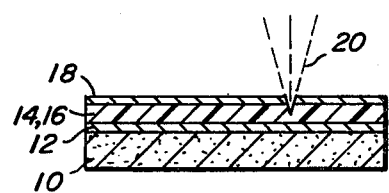

The above steps produce a complete capacitor which can be tested. The dimensions of the electrodes 12 and 18 and the thickness of the dielectric 14, 16 can be selected to provide the desired value within broad limits. However, because of tolerances, there will be some variations in value. To take care of this, the dimensions are selected so that the value is on the high side and can be reduced by trimming the top thin electrode 18. This can be accomplished by directing a laser beam 20 against electrode 18 to vaporize a portion thereof, as shown by FIG. 1J. As the electrode 18 is extremely thin, a very low energy beam can be used. In addition to requiring low power, this has the further advantage that it does not penetrate through the dielectric 14, 16 or cause other damage to the capacitor. The laser 20 can be directed to remove a line across electrode 18, or to provide any desired pattern, as is well known.

As stated above, organo-metallic pastes having platinum or palladium particles can be used for the thin top electrode, but paste with gold atoms has the advantage that the sheet resistance of the electrode is much less than for these other metals. The higher resistance of the electrode reduces the Q of the capacitor, so that the use of gold gives a higher Q than that produced by the use of paste including platinum or palladium.

The materials referred to above which form the organo-metallic paste, that is Engelhard Bright Gold No. A3725 and No. 6340, are known for use as decorative coatings, but have not been used to provide an extremely thin electrode which can be easily trimmed by use of low energy. We have found that the thin sintered layer of gold particles having a thickness of the order of 1 micron forms an effective electrode and is easily trimmed to adjust the capacitor value.

Although in the process described each paste layer is dried and fired before the next layer is applied, it may be satisfactory in some instances to dry each layer before the next layer is applied, and then fire a plurality of layers at the same time. This has the disadvantage that solvent from the applied paste layer may penetrate the lower dried layer. When the layer is fired before the next paste layer is applied, this action is minimized.

FIG. 2 is an enlarged cross-sectional view of a capacitor constructed in accordance with the invention, generally similar to FIG. 1J. The thickness of the substrate 10 is not critical, and will be determined by the particular application. As previously stated, this may be in the range from 10 to 25 mils. The first platinum-silver electrode 12 has a reference thickness X, which can be in the range from 12 to 15 microns (0.5 mil). The dielectric 14, 16 can be about twice this thickness, 2X or somewhat more. As has been stated, a thickness in the range from 30 to 40 microns has been found to be suitable. The top gold electrode 18 is much thinner and has a thickness of only one tenth X or about 1 micron.

FIGS. 2, 3 and 4 show a chip capacitor which can be constructed by the process which has been described. In this case, the capacitor is built up on a chip carrier 22, which is generally equivalent to the substrate shown in FIGS. 1 and 2. This chip carrier 22 can also be formed of alumina, and can have a thickness of from 15 to 25 mils. The first electrode 24 is formed on the chip carrier 22, as by applying a platinum-silver conductive paste. This is screened in a pattern as shown by FIG. 3 and dried and fired to form a layer having a thickness of about 13 microns (0.5 mil). The dielectric material 26 is then applied on the electrode 24 and to cover the remainder of the chip carrier 22 not covered by electrode 24. This can be applied in two layers, as described, to form a thickness of about 30 microns. Then the gold top electrode 28 is applied on the dielectric 26, in the manner previously described. This can be an organo-metallic paste including molecules containing gold atomic particles. The paste can be screened in a desired pattern with a thickness of about 25 microns. When this is dried and fired, a conductive layer of gold particles is formed having a thickness of the order of 1 micron, as had been described.

As shown by FIG. 4, the bottom surface of the carrier 22 has conductive coatings 30 and 32 thereon which facilitate connecting the chip capacitor to a printed circuit board, or the like. The coating 30 is connected by a plating 34 in a recess in the carrier 22 to the bottom electrode 24, and the coating 32 is connected by a plating 36 in a recess in the carrier 22, and a continuing recess in the dielectric 26, to the top electrode 28. Thus, the coatings 30 and 32 form terminals for the chip capacitor of FIG. 3 for connecting the same in a circuit.

It is noted that the bottom electrode 24 does not extend to the conductive plating 36 (FIG. 4) and that the top electrode 28 does not engage the plating 34. Additional conductors plated through openings in the chip carrier 22 can be provided for connecting terminal pad 30 to electrode 24, if desired. The bottom of the carrier 22 (FIG. 4) can also have bands 38 thereacross to designate the value of the chip capacitor, as is known.

The value of the capacitor of FIG. 3 can be adjusted by trimming the thin top electrode 28, as has been described. As the electrode 28 is formed by small sintered conductive atoms or particles which engage each other, a low energy laser beam can be used for this purpose. Such a low energy beam will vaporize the very thin layer without penetrating through the dielectric 26, as generally illustrated by FIG. 2. The capacitor is not shorted or otherwise damaged by this trimming operation. The capacitor value can be monitored during trimming so that a capacitor having a highly accurate value can be produced.

By use of the process described, a thick film capacitor is produced, the value of which can be adjusted so that a highly accurate capacitor is provided at low cost. The thick film process is much less expensive than known thin film processes, and as the top electrode is very thin it can be trimmed by use of a low energy laser beam which does not penetrate the dielectric layer, or otherwise damage the capacitor.

What is claimed is:

1. The process for making a thick film capacitor including the steps of:
   screening a first layer of conductive paste on a substrate to form a capacitor electrode,
   drying the first conductive paste layer,
   screening a second dielectric paste layer over the first layer to form the capacitor dielectric,
   drying the second dielectric paste layer,
   screening a third layer of organo-metallic paste having molecules containing conductive particles over the second layer to form a second capacitor electrode,
   drying the third organo-metallic paste layer,
   firing the first, second and third layers, and continuing such firing until the third layer is reduced to a layer of conductive particles having a maximum thickness of 2 microns, and
   trimming the third layer to adjust the size of the electrode formed thereby and the value of the capacitor.

2. The process of claim 1 wherein an additional layer of dielectric paste is applied over the second dielectric layer prior to the application of the third layer of organo-metallic paste.

3. The process of claim 1 wherein the organo-metallic layer includes molecules containing gold atoms.

4. The process of claim 3 wherein the third layer is reduced to a thickness of the order of 1 micron.

5. The process of claim 4 wherein the third layer is trimmed by vaporizing a portion of the top electrode by use of a low energy laser beam.

* * * * *